United States Patent [19]

Kurihara et al.

[11] Patent Number: 4,937,684
[45] Date of Patent: Jun. 26, 1990

[54] INFORMATION RECORDING-REPRODUCING APPARATUS

[75] Inventors: Hitoshi Kurihara, Yorii; Kenichi Suzuki; Kazuo Minoura, both of Yokohama, all of Japan

[73] Assignees: Canon Kabushiki Kaisha, Tokyo; Canon Denshi Kabushiki Kaisha, Saitama, both of Japan

[21] Appl. No.: 336,532

[22] Filed: Apr. 12, 1989

Related U.S. Application Data

[63] Continuation of Ser. No. 918,908, Oct. 15, 1986, abandoned.

[30] Foreign Application Priority Data

Oct. 16, 1985 [JP] Japan .................................. 60-228902
Oct. 24, 1985 [JP] Japan .................................. 60-236387

[51] Int. Cl.$^5$ ............................................ G11B 25/04
[52] U.S. Cl. .......................................... 360/2; 235/480
[58] Field of Search ...................... 360/2, 88; 235/475, 235/480, 481

[56] References Cited

U.S. PATENT DOCUMENTS 4,019,025 4/1977 Taniguchi ........................... 235/480
4,377,828 3/1983 Hayman ................................ 360/88

FOREIGN PATENT DOCUMENTS 52-76831 6/1977 Japan ..................................... 360/88
61-029084 8/1986 Japan .

Primary Examiner—A. J. Heinz
Attorney, Agent, or Firm—Fitzpatrick, Cella, Harper & Scinto

[57] ABSTRACT

An information recording-reproducing apparatus comprises a head, a first pair of rollers for guide-driving a recording medium relative to the head, a second pair of rollers for guide-driving the recording medium toward or from the first pair of rollers, and a controller for timingly controlling the first and second pairs of rollers. The first and second pairs of rollers are disposed at such an interval that the recording medium may not be caught by both of the first and second pairs of rollers at a constant velocity movement of the recording medium.

6 Claims, 5 Drawing Sheets

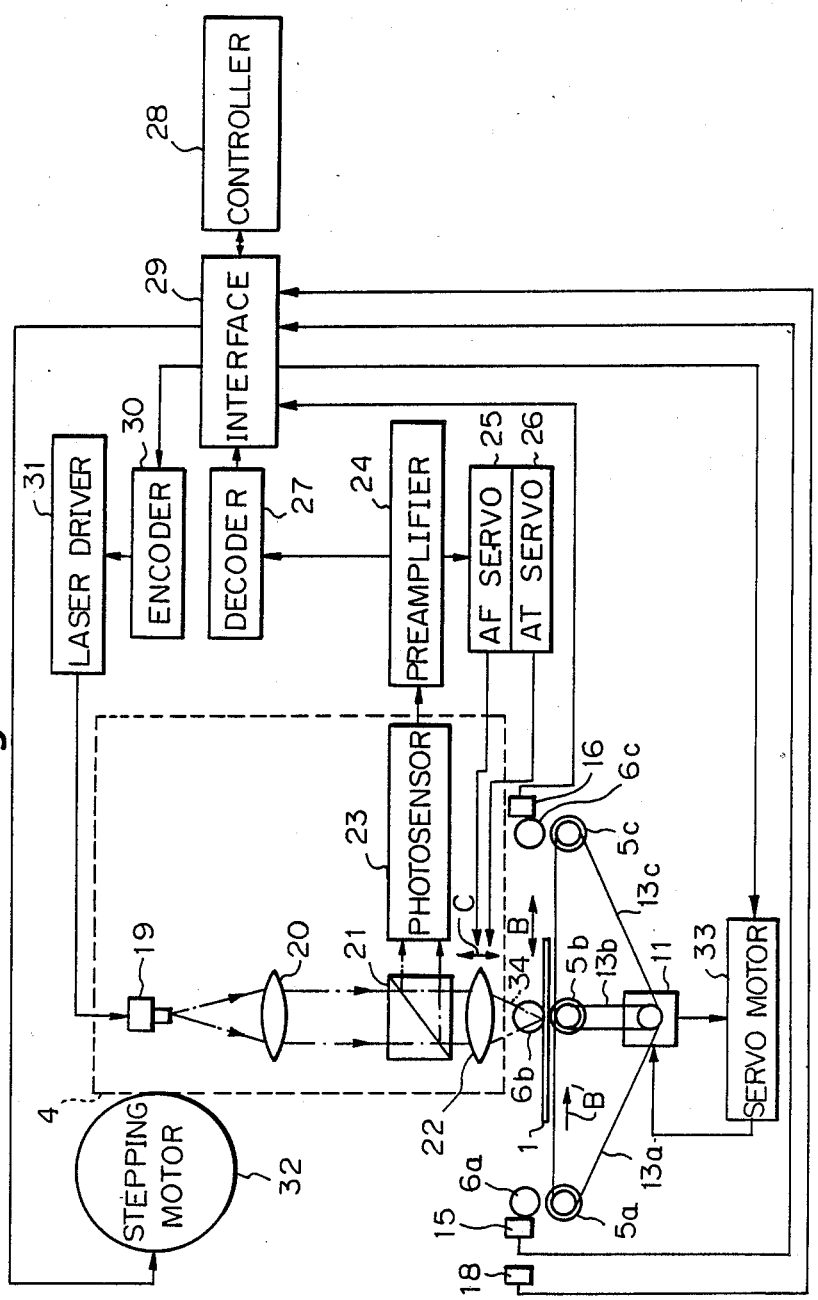

INFORMATION RECORDING-REPRODUCING APPARATUS

This application is a continuation of application Ser. No. 918,908, filed Oct. 15, 1986, now abandoned.

BACKGROUND OF THE INVENTION

1. Field of the Invention

This invention relates to an information recording-reproducing apparatus in which an information recording medium and a recording-reproducing head are moved relative to each other to thereby accomplish recording and/or reproduction of information, and in particular to an information recording-reproducing apparatus in which the velocity at which the information recording medium is moved is stabilized and made constant.

2. Related Background Art

The forms of the information recording medium include a disk-like one (such as a magnetic disk, an optical disk or a magneto-optical disk), a tape-like one (such as a magnetic tape or an optical tape) and a card-like one (such as a magnetic card or an optical card). Among these, the card-like information recording medium (hereinafter simply referred to as the card) is finding wider use because of its excellence in accessibility, ease of manufacture and portability, and particularly, optical type optical cards permit highly dense recording and have therefore been actively studied in recent years. The case of the card will hereinafter be described as an example.

In an information recording-reproducing apparatus using such a card, the card is reciprocally moved relative to a recording-reproducing head to thereby scan the data track of the card and accomplish recording reproduction of information.

FIGS. 1(A) and (B) of the accompanying drawings illustrate the operation of a card driving mechanism in an information recording-reproducing apparatus according to the prior art.

In these Figures, drive rollers 5a, 5b and 5c are rotated in a predetermined direction and at a predetermined speed by driving means, not shown, and pressing rollers 6a, 6b and 6c biased by bias means press the drive rollers 5a, 5b and 5c with suitable pressure. Hereinafter, the drive roller 5a and the pressing roller 6a will be referred to as a pair of rollers a, and the set of roller 5b and 6b and the set of roller 5c and 6c will likewise be referred to as a pair of rollers b and a pair of rollers c, respectively.

The card 1 is nipped between the pair of rollers a, b or c and reciprocally moved by roy reproduction of information.

FIGS. 1(A) and (B) of the accompanying drawings illustrate the operation of a card driving mechanism in an information recording-reproducing apparatus according to the prior art.

In these Figures, drive rollers 5a, 5b and 5c are rotated in a predetermined direction and at a predetermined speed by driving means, not shown, and pressing rollers 6a, 6b and 6c biased by bias means press the drive rollers 5a, 5b and 5c with suitable pressure. Hereinafter, the drive roller 5a and the pressing roller 6a will be referred to as a pair of rollers a, and the set of roller 5b and 6b and the set of roller 5c and 6c will likewise be referred to as a pair of rollers b and a pair of rollers c, respectively.

The card 1 is nipped between the pair of rollers a, b or c and reciprocally moved by rotation of those rollers, and recording reproduction of information is effected by a recording-reproducing head, not shown. However, the length of the card 1 in the direction in which it is reciprocally moved is $L_1$, the interval between the drive rollers 5 and between the pressing rollers 6 is $L_2$, and $L_1$ and $L_2$ are in the relation that $L_1 > L_2$.

The above described example of the prior art, however, has suffered from a problem that the card 1 cannot be stably moved at a predetermined velocity.

In the above-described example of the prior art, let it be assumed that, as shown in FIG. 1(A), the card 1 is being moved in the direction of arrow B' while being nipped between the pairs of rollers a and b. In this state, the card 1 is being moved at a predetermined velocity conforming to the speed of rotation of each roller.

However, since $L_1 > L_2$, the leading end of the card 1 is nipped between the pair of rollers c as shown in FIG. 1(B) and at that time, the movement velocity of the card 1 unavoidably fluctuates greatly. Also, where each pair of rollers are rotated in the opposite direction to move the card 1 in the direction opposite to the direction of arrow B', similar fluctuation of the velocity will occur when the leading end of the card 1 is nipped between the pair of rollers a.

If the velocity of the card 1 thus fluctuates suddenly, it will become impossible to accomplish proper recording and reproducing operations and the reliability as an information recording-reproducing apparatus will be greatly reduced. Particularly, in an optical type information recording-reproducing apparatus, a minute light spot is formed and highly dense recording is effected at a high speed and therefore, such instability of the operation must be avoided to the utmost.

Also, recording and reproducing operations can be accomplished with the velocity fluctuation area being avoided, but in such case, the information recording capacity decreases correspondingly and therefore, such means of solution cannot be adopted.

SUMMARY OF THE INVENTION

It is an object of the present invention to provide an apparatus having such a card conveying mechanism that no fluctuation of the movement velocity of an information recording medium such as a card occurs during the recording and/or reproduction of information.

It is a further object of the present invention to provide an apparatus having such a card conveying mechanism that no fluctuation of the movement velocity of the card occurs during the recording and/or reproduction of information without the information recording area of the card being decreased.

In an information recording-reproducing apparatus according to the present invention, the information recording medium is reciprocally moved while being nipped between a pair of rollers one of which is a drive roller during the recording and/or reproduction of information on the information recording medium, thereby achieving the above objects. The pair of rollers are provided at the same position as the recording-reproducing head, and besides said pair of rollers, plural pairs of rollers are provided in the directions of reciprocal movement of the information recording medium, and said plural pairs of rollers are disposed outside the reciprocal movement range of the information recording medium.

In a further information recording-reproducing apparatus according to the present invention, the information recording medium is caught by plural pairs of rollers during the recording and/or reproduction of information, and the information recording medium is caught by two pairs of rollers disposed adjacent to each other during the acceleration and deceleration of the medium, and the medium is moved at a constant velocity during the recording and reproduction. That is, the information recording medium is adapted to be caught by two pairs of rollers disposed adjacent to each other during the non-constant velocity movement thereof.

BRIEF DESCRIPTION OF THE DRAWINGS

FIG. 5 shows an embodiment of the information recording-reproducing apparatus according to the present invention.

DESCRIPTION OF THE PREFERRED EMBODIMENTS

Figure 1:
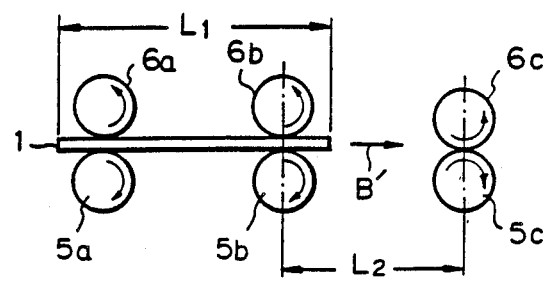
FIGS. 1(A) and (B) show the card driving mechanism of an information recording-reproducing apparatus according to the prior art.
Figure 1:
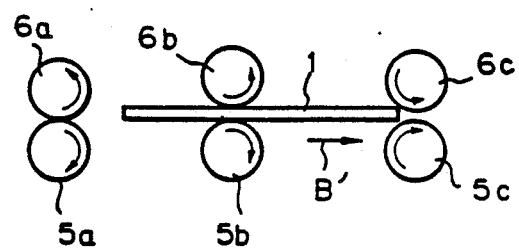
Figure 2A:
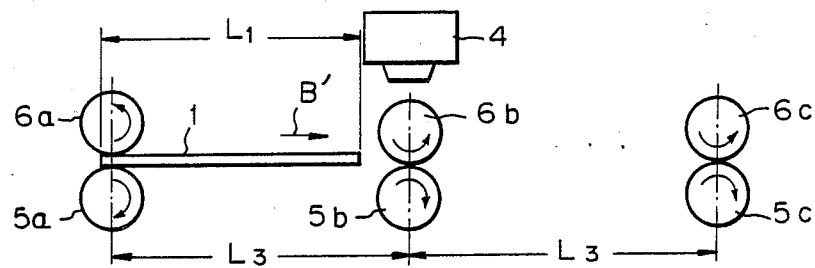
FIGS. 2(A), (B) and (C) and FIGS. 3(A), (B), (C) and (D) schematically show an embodiment of the card driving mechanism of an information recording-reproducing apparatus according to the present invention.
Figure 2B:
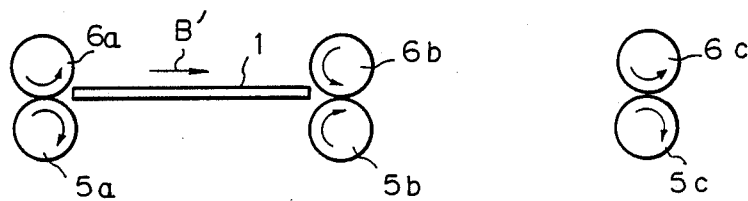
Figure 2C:
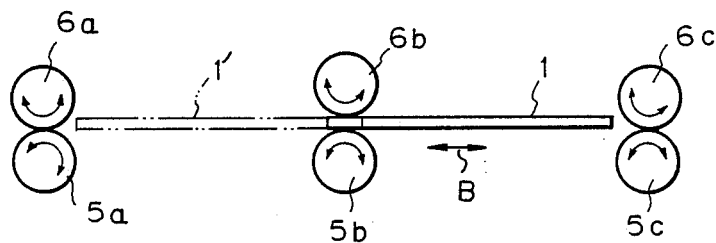

FIGS. 2(A)–2(C) illustrate the operation of a card driving mechanism in an embodiment of an information recording-reproducing apparatus according to the present invention.

In these Figures, pairs of rollers a, b and c are disposed at an interval $L_3$ longer than the distance $L_1$ of a card 1, and a recording-reproducing head 4 is provided adjacent to the pair of rollers b. Of course, the pair of rollers b and the head 4 are disposed at positions deviating from each other in a direction perpendicualr to the plane of the drawing sheet, and the head 4 are movable in the direction perpendicular to the plane of the drawing sheet as will be described later.

When the card 1 is inserted into the driving mechanism as shown in FIG. 2(A), it is conveyed in the direction of arrow B' by rotation of the pair of rollers a. Subsequently, as shown in FIG. 2(B), the card 1 is discharged from the pair of rollers a and becomes nipped between the pairs of rollers b which are likewise rotating.

The card 1 nipped between the pair of rollers b as indicated at a position 1' in FIG. 2(C) are reciprocally moved in the directions of bilateral arrow B by the operation of the pair of rollers b and recording/reproduction of information is effected by the head 4. Since $L_3 > L_1$, the card 1 does not touch the pairs of rollers a and c at that time, but are reciprocally moved by only the rotation of the pair of rollers b. Accordingly, the velocity of movement of the card 1 is not fluctuated by disturbance and therefore, reliable recording/reproduction can be accomplished. Also, since the head 4 is provided at the same location as the pair of rollers b, the fluctuation of the distance between the head 4 and the card 1 is minimized, and the recording-reproducing operation particularly in the case of an optical card is stabilized.

When the card 1 is to be discharged, the card 1 is first discharged from the pair of rollers b toward the pair of rollers a or toward the pair of rollers c and is discharged outwardly by the pair of rollers a or c. If the insertion port and the discharge port for the card 1 are identical, the pair of rollers c will be unnecessary.

As the means for inserting the card 1 between the pair of rollers b for reciprocally moving the card 1, not only the discharge as described above may be resorted to, but also the card 1 may be inserted between the pair of rollers b by conveying means movable in the directions of bilateral arrow B.

Figure 3A:
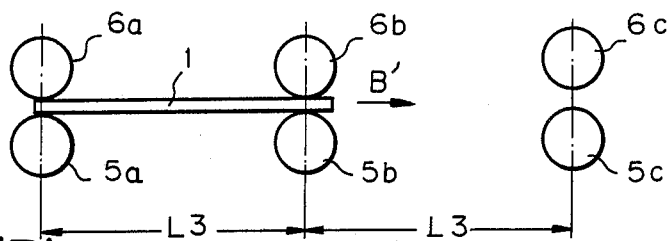
Figure 3B:
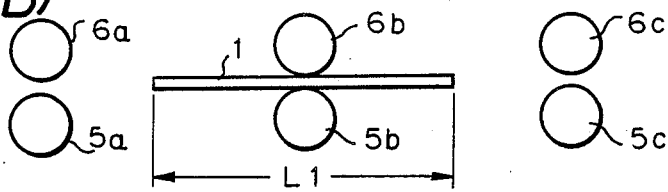
Figure 3C:
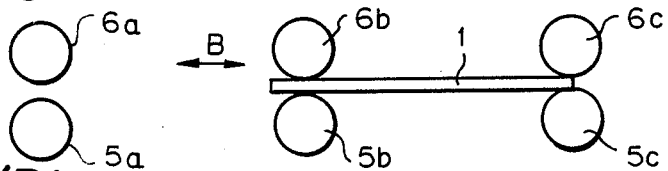
Figure 3D:
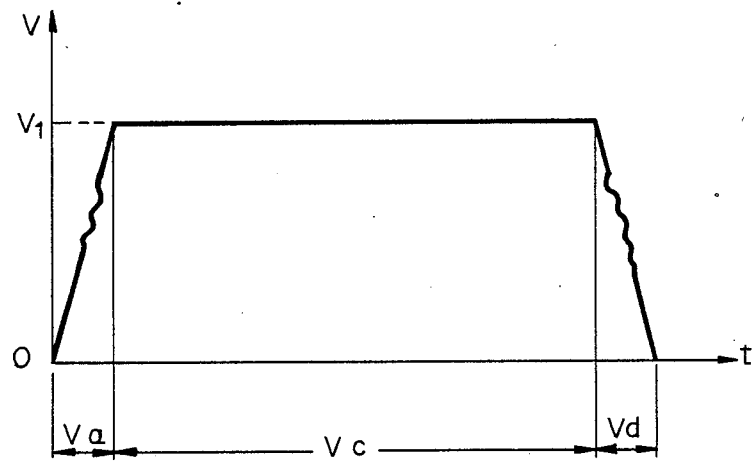

FIGS. 3(A)–3(C) illustrate the operation of a card driving mechanism in a further embodiment of the information recording-reproducing apparatus according to the present invention, and FIG. 3(D) is a graph showing the variation in the velocity of the card.

In FIGS. 3(A)–3(D), pairs of rollers a, b and c are disposed at an interval $L_3$ longer than the conventional interval $L_2$ between the pairs of rollers. This interval $L_3$ is determined so that the operation described below may be performed.

When the card 1 is inserted into the driving mechanism as shown in FIG. 3(A), accelaration of the card 1 in the direction of arrow B' is initiated by rotation of the pair of rollers a (Va in FIG. 3(D)). Within this acceleration range Va, the leading end of the card 1 is nipped between the pair of rollers b and the trailing end thereof is discharged from the pair of rollers a. Accordingly, fluctuation of the velocity occurs within the acceleration range Va, and after the card 1 has reached a predetermined volocity $V_1$, the card 1 is moved at the predetermined velocity $V_1$ by the pair of rollers b (Vc in FIG. 3(D)).

Subsequently, when the card 1 initiates its deceleration at a turn-back point (Vd in FIG. 3(D)), the leading end of the card 1 is nipped between the pair of rollers c as shown in FIG. 3(C). At this point of time, the pair of rollers b reverse their rotations and the card 1 initiates its acceleration in the direction opposite to the direction of arrow B' (Va in FIG. 3(D)). Accordingly, the fluctuation of the velocity when the leading end of the card 1 has been nipped between the pair of rollers c occurs within the deceleration range Vd of the card 1. Also, the card 1 is stably supported near the turn-back point by the pairs of rollers b and c.

Thereafter, in a similar manner, the card 1 is reciprocally moved in the directions of bilateral arrow B, and at the time of a predetermined velocity range Vc, recording/reproduction of information is effected by a head, not shown. By the length $L_1$ of the card 1 and the interval $L_3$ between the pairs of rollers being thus set so that fluctuation of the velocity occurs during the acceleration or deceleration of the card 1, the predetermined velocity range of the card 1 can be widened more than before and the recording area can be increased.

The specific construction of the present embodiment for performing the above-described operation will now be described with respect to an optical type information recording-reproducing apparatus.

Figure 4A:
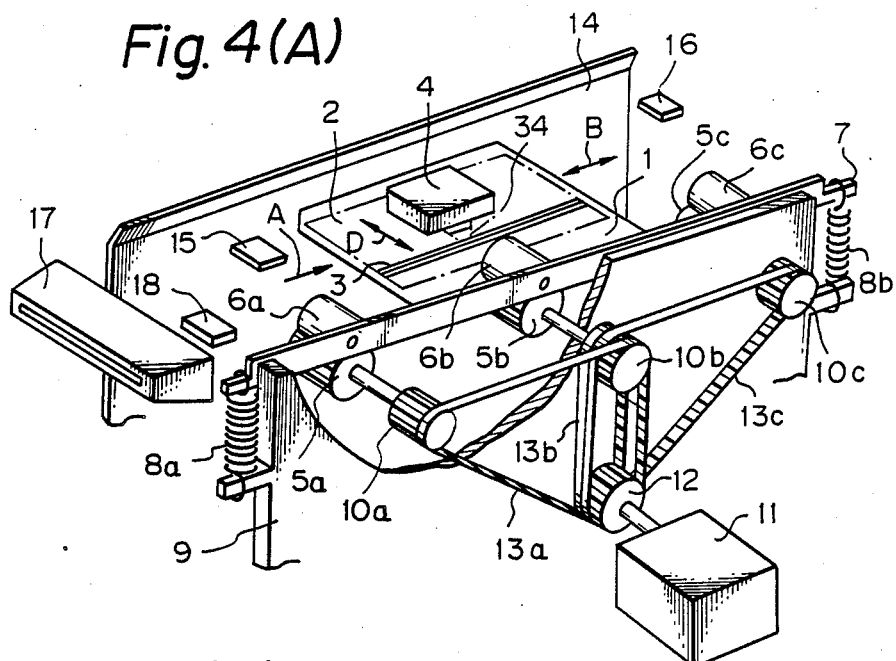
FIGS. 4(A), (B) and (C) show an embodiment of the card driving mechanism m of an information recording-reproducing apparatus according to the present invention.
Figure 4B:
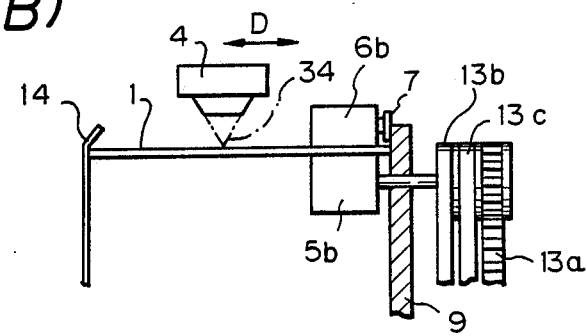
Figure 4C:
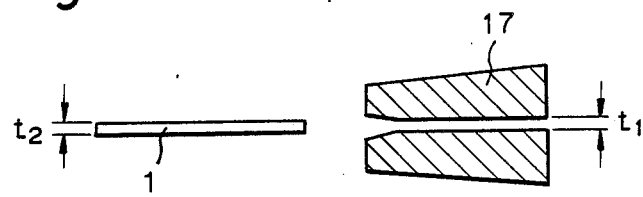

FIG. 4(A) is a perspective view showing the construction of the card driving mechanism in the present embodiment, FIG. 4(B) is a schematic view thereof taken in the direction of arrow A in FIG. 4(A), and FIG. 4(C) is a schematic cross-sectional view of the card insertion portion thereof.

An optical card 1 has a recording area 2, information is recorded as a pit row on the recording area 2, and the pit row is herein referred to as an information track 3. Reproduction of the information is accomplished by scanning the information track 3. Recording/reproduction of the information is accomplished by the utilization of a light beam 34 from the head 4 as will be described later.

Pairs of rollers a, b and c for reciprocally moving the optical card 1 in the directions of bilateral arrow B are installed at an interval $L_3$ as described above. Among these rollers, pressing rollers 6a, 6b and 6c are rotatably installed on a connecting plate 7, the opposite ends of which are connected to a frame 9 through springs 8a and 8b as bias means. Thereby the pressing rollers 6a, 6b and 6c are biased to press driving rollers 5a, 5b and 5c, respectively.

The rotary shafts of the driving rollers 5a, 5b and 5c rotatably extend through the frame 9 and have pulleys 10a, 10b and 10c fixed thereto. Revolution of a motor 11 is transmitted to the pulleys 10a, 10b and 10c through a motor pulley 12 and timing belts 13a, 13b and 13c to thereby rotate the driving rollers 5a, 5b and 5c.

The optical card 1 reciprocally moved while being nipped between the pairs of rollers a, b and c has its unnipped side pressed by a plate spring 14 and has its nipped side urged against the frame 9. Accordingly, the optical card 1 is given a drive force by rotation of the pair of rollers b and is guided by the frame 9 and effects stable reciprocal movement.

The head 4, as shown in FIG. 4(B), is moved in the direction of arrow D at a position whereat the optical card 1 is nipped between the pair of rollers b, and applied a light beam onto the recording area 2.

To reciprocally moved the optical card 1, the motor 11 may be reversed in revolution, and for the purpose of effecting reversal timing, position sensors 15 and 16 are provided at the opposite ends of the movement range of the optical card 1. Also, a detecting sensor 18 is provided near a card insertion port 17 to detect the insertion of the optical card 1 from the card insertion port 17.

as shown in FIG. 4(C), the gap $t_1$ of the card insertion port 17 and the thickness $t_2$ of the optical card 1 are in the relation that $t_2 < t_1$ so that any card having a thickness exceeding a predetermined thickness cannot be inserted.

The operation of the above-described driving mechanism and the specific operation of the present embodiment will now be described.

FIG. 5 is a block diagram of an operation control circuit in the present embodiment.

Referring to FIG. 5, the head 4 is comprised of a laser 19, a collimator lens 20, a beam splitter 21, an objective 22 and a photosensor 23. The output of the photosensor 23 is input to a preamplifier 24, and by the utilization of the output of the preamplifier 24, auto-focusing (hereinafter referred to as AF) and autotracking (hereinafter referred to as AT) are effected by an AF servo circuit 25 and an AT servo circuit 26. That is, the objective 22 is driven in the direction of arrow C by the AF servo circuit 25 to focus a light beam 34, and the objective 22 is finely driven in the direction of arrow D by the AT servo circuit 26 to cause the light beam to follow the information track 3.

Also, the output of the preamplifier 24 is demodulated by a decoder 27 and is put out to the outside through an interface 29 on the basis of the instruction of a control unit 28.

When recording of information is to be effected, the information is modulated by an encoder 30 to drive a laser driver 31, and a modulated light beam of high power is put out from the laser 19, whereby a pit row is formed on the recording area 2 of the optical card 1. The head 4 itself is driven in the direction of arrow D by a stepping motor 32.

Further, the operation of the motor 11 for reciprocally moving the optical card 1 is controlled by a servo motor circuit 33 on the basis of the outputs of the position sensors 15 and 16 and the detecting sensor 18.

The operation of the above-described control circuit during information reproduction will now be described.

When the optical card 1 is inserted from the card insertion port 17, a detection signal is put out from the detecting sensor 18 and is input to the control unit 28 through the interface 29. Thereby the control unit 28 controls the servo motor circuit 33 to revolve the motor 11 in a forward direction and the optical card 1 is drawn in the direction of arrow B' by the pair of rollers a. As already described, the optical card 1 is then nipped between the pair of rollers b and its reciprocal movement in the directions of bilateral arrow B is started. At that time, the optical card 1 is first detected by the position sensor 16 and the detection signal is input to the control unit 28. Thus, the control unit 28 puts out a reverse revolution signal to the servo motor circuit 33, which in turn reverses the revolution of the motor 11, thereby moving the optical card 1 in the opposite direction. When the optical card 1 is likewise detected by the position sensor 15, the control unit 28 puts out a forward revolution signal to the servo motor circuit 33, which in turn revolves the motor in a forward direction to thereby move the optical card 1 in the direction of arrow B'. The abovedescribed operation is repeated, whereby the optical card 1 is reciprocally moved.

With such reciprocal movement, reading-out of the information is effected by the head 4.

First, the control unit 28 controls the laser driver 31, which in turn drives the laser 19, from which is emitted a light beam of such a degree of predetermined power that no pit is formed on the recording area 2. This light beam is collimated by the collimator lens 20, is transmitted through the beam splitter 21 and is condensed by the objective 22, and as a light beam 34, it forms a light spot on the information track 3. At that time, if the optical card is one having an AT track, another light spot will be applied to the AT track.

The reflected light from the information track (and the AT track) is transmitted through the objective 22 and reflected by the beam splitter 21, and enters the photosensor 23. This reflected light from the information track 3 is changed by the presence or absence of the pit and that change is converted into an electrical signal by the photosensor 23. This electrical signal is amplified by the preamplifier 24, is demodulated by the decoder 27 and is delivered to the outside as a reproduction signal. That is, by the optical card 1 being reciprocally moved by the pair of rollers b, the pit row is scanned by the light spot and reproduction of the information is accomplished.

Also, the AF servo circuit 25 and the AT servo circuit 26 effect AF and AT operations, respectively, by the utilization of the output from the preamplifier 24 and thereby cause the light beam 34 to be properly applied onto the information track 3. Further, access of the information is accomplished by moving the optical card 1 in the directions of bilateral arrow B and moving the head 4 in the direction of arrow D by the stepping motor 32.

The operation of the control unit during recording is identical with regard to the reciprocal movement of the optical card 1 and to the AF and AT operations. In the case of recording, when the information from outside is input through the interface 29, that information is modulated by the encoder 30 and in accordance with the modulated information, the laser driver 31 drives the laser 19 with a high power. Thus, the modulated light beam 34 of high power is applied onto the recording area 2 of the optical card 1 which is being reciprocally moved, and a pit row corresponding to the information is formed on that portion to which the light beam has been applied.

The recording-reproducing operation is accomplished in the manner described above, but in the embodiment shown in FIG. 2, the optical card 1 is reciprocally moved by a pair of rollers b and therefore, the optical card 1 is always moved at a predetermined velocity except at the turn-back point and accordingly, accurate recording/reproduction of information can be accomplished.

Also, since the head 4 is provided at the same position as the pair of rollers b for reciprocally moving the optical card 1, any fluctuation of the distance between the head 4 and the optical card 1 can be suppressed. Therefore, the movement distance of the objective 22 during AF and AT operations can be set to a small value and thus, the actuator can be made compact. Also, the control operations of AF and AT servo systems are stabilized and accurate recording/reproduction of information is accomplished.

Also, in the embodiment shown in FIG. 3, the optical card 1 is nipped between or discharged from the pair of rollers a or c during the acceleration or deceleration at the turn-back point and therefore, even if the card is caught by the plurality of rollers during recording/reproduction, the constant velocity movement range $V_c$ can be secured widely and thus, the recording area 2 of the card 1 can be widened.

Also in the embodiment shown in FIG. 4, the head 4 is provided at the same position as the pair of rollers b which contribute chiefly to the reciprocal movement of the optical card 1 and therefore, any fluctuation of the distance between the head 4 and the optical card 1 can be suppressed. Therefore, the movement distance of the objective 22 during AF and AT operations can be set to a small value and thus, the actuator can be made compact. Also, the control operations of AF and AT servo systems are stabilized and accurate recording/ reproduction of information is accomplished.

We claim:

1. An information recording-reproducing apparatus comprising:
   a head for effecting recording and reproducing;
   first roller means for reciprocally guide-driving a recording medium, which has a length along the reciprocal guide-driving direction, relative to the head;
   second roller means for guide-driving the recording medium toward or from said first roller means by direct contact with the recording medium, said first and second roller means being disposed at an interval longer than said length of the recording medium in the reciprocal guide-driving direction; and
   means for timingly controlling said first and second roller means.

2. An information recording-reproducing apparatus according to claim 1, wherein said head is disposed at substantially the same position as said first roller means with respect to the guide-driving direction.

3. An information recording-reproducing apparatus according to claim 1, wherein each of said first and second roller means comprises a pair of rollers one of which is timingly controlled by said controlling means.

4. An information recording-reproducing apparatus comprising:
   a head;
   first roller means for reciprocally guide-driving a recording medium relative to the head;
   second roller means for guide-driving the recording medium toward or from said first roller means by direct contact with the recording medium, said first and second roller means being disposed at such an interval that the recording medium be caught in direct contact with, and reciprocally moved solely by, said first roller means at the time of recording and reproduction effected by the head; and
   means for timingly controlling said first and second roller means.

5. An information recording-reproducing apparatus comprising:
   a head;
   a pair of rollers for reciprocally guide-driving a recording medium relative to the head, the recording medium being reciprocally moved solely by said pair of rollers in direct contact with the recording medium at the time of recording and reproduction effected by said head;
   position sensors provided at opposite ends of a range of movement of the recording medium on either side of said head for effecting reversal timing of the recording medium;
   auto-focusing means for focusing a light beam emitted from said head by driving an objective along its optical axis in said head; and
   auto-tracking means for causing the light beam emitted from said head to follow an information track on the recording medium by driving the objective in a direction orthogonal to the reciprocal guide-driving direction.

6. An information recording-reproducing apparatus according to claim 5, wherein said head is positioned in the vicinity of said pair of rollers.

* * * * *

UNITED STATES PATENT AND TRADEMARK OFFICE
CERTIFICATE OF CORRECTION

PATENT NO. : 4,937,684

DATED : June 26, 1990

INVENTOR(S) : Hitoshi Kurihara et al.

It is certified that error appears in the above-identified patent and that said Letters Patent is hereby corrected as shown below:

COLUMN 1:

Line 53, "roy reproduction of infor-" should be deleted.
    Lines 54-68 should be deleted.

COLUMN 2:

Line 1 should be deleted.
    Line 2, "c and reciprocally moved by" should be deleted.
    Line 9, "above described" should be --above-described--.

COLUMN 3:

Line 24, "m" should be deleted.
    Line 42, "perpendicualr" should read --perpendicular--.
    Line 43, "are" should read --is--.
    Line 54, "are" should read --is--.
    Line 59, "are" should read --is--.

COLUMN 4:

Line 32, "volocity $V_1$," should read --velocity $V_1$,--.

UNITED STATES PATENT AND TRADEMARK OFFICE
CERTIFICATE OF CORRECTION

PATENT NO. : 4,937,684

DATED : June 26, 1990

INVENTOR(S) : Hitoshi Kurihara et al.

It is certified that error appears in the above-identified patent and that said Letters Patent is hereby corrected as shown below:

COLUMN 5:

Line 32, "plied" should read --plies--.
    Line 33, "moved" should read --move--.
    Line 40, "as" should read --Also, as--.

COLUMN 6:

Line 33, "abovedescribed" should read --above-described--.

Signed and Sealed this

Eighth Day of December, 1992

Attest:

DOUGLAS B. COMER

*Attesting Officer*    *Acting Commissioner of Patents and Trademarks*